United States Patent
Jeromin et al.

(10) Patent No.: US 10,776,636 B2
(45) Date of Patent: *Sep. 15, 2020

(54) STEREO CAMERA-BASED DETECTION OF OBJECTS PROXIMATE TO A VEHICLE

(71) Applicant: Faraday&Future Inc., Gardena, CA (US)

(72) Inventors: Oliver Max Jeromin, Holland, MI (US); Paul Alan Theodosis, Rancho Palos Verdes, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,409

(22) Filed: Dec. 23, 2016

(65) Prior Publication Data
US 2017/0185851 A1    Jun. 29, 2017

Related U.S. Application Data

(60) Provisional application No. 62/272,556, filed on Dec. 29, 2015.

(51) Int. Cl.
*B60R 11/04* (2006.01)
*H04N 13/00* (2018.01)
(Continued)

(52) U.S. Cl.
CPC ..... *G06K 9/00805* (2013.01); *G06K 9/00208* (2013.01); *G06K 9/00369* (2013.01);
(Continued)

(58) Field of Classification Search
None
See application file for complete search history.

(56) References Cited

U.S. PATENT DOCUMENTS

| 6,535,114 B1 | 3/2003 | Suzuki et al. |
| 8,615,109 B2 | 12/2013 | Shimizu |

(Continued)

FOREIGN PATENT DOCUMENTS

| EP | 2 543 544 A1 | 1/2013 |
| WO | WO-2015/177648 A1 | 11/2015 |
| WO | WO-2017/132143 A1 | 8/2017 |

OTHER PUBLICATIONS

International Search Report dated May 8, 2017, for PCT Application No. PCT/US2017/014973, filed Jan. 25, 2017, three pages.

(Continued)

*Primary Examiner* — Kaitlin A Retallick
(74) *Attorney, Agent, or Firm* — Veros Legal Solutions, LLP

(57) ABSTRACT

A system is disclosed. The system includes one or more processors, and a memory including instructions, which when executed by the one or more processors, cause the one or more processors to perform a method. The method includes receiving first image data from a first image sensor mounted on a vehicle and second image data from a second image sensor mounted on the vehicle, the vehicle including an element configured to open into a space external to the vehicle; generating a depth map from a comparison of the first image data and the second image data, the depth map including an object; in accordance with a determination that the object, in the depth map, is within the space into which the element is configured to open, determining that the object will interfere with opening of the element into the space; and in accordance with a determination that the object, in the depth map, is not within the space into which the element is configured to open, determining that the object will not interfere with opening of the element into the space.

13 Claims, 4 Drawing Sheets

(51) Int. Cl.
*H04N 13/239* (2018.01)
*H04N 13/243* (2018.01)
*H04N 13/246* (2018.01)
*H04N 13/271* (2018.01)
*G06K 9/00* (2006.01)
*G06T 7/80* (2017.01)
*H04N 7/18* (2006.01)

(52) U.S. Cl.
CPC ............... *G06T 7/85* (2017.01); *H04N 7/181* (2013.01); *H04N 13/239* (2018.05); *H04N 13/243* (2018.05); *H04N 13/246* (2018.05); *H04N 13/271* (2018.05); *B60R 11/04* (2013.01); *G06T 2207/10012* (2013.01); *G06T 2207/30261* (2013.01); *H04N 2013/0081* (2013.01)

(56) References Cited

U.S. PATENT DOCUMENTS

| | | | | |
|---|---|---|---|---|
| 2002/0011924 | A1* | 1/2002 | Schwartz | B60Q 1/54 340/425.5 |
| 2004/0045339 | A1* | 3/2004 | Nichani | G06K 9/00771 73/1.01 |
| 2005/0280518 | A1 | 12/2005 | Bartels et al. | |
| 2008/0061999 | A1 | 3/2008 | Birk et al. | |
| 2008/0205706 | A1 | 8/2008 | Hongo | |
| 2009/0000196 | A1 | 1/2009 | Kollar et al. | |
| 2011/0169957 | A1 | 7/2011 | Bartz | |
| 2013/0088578 | A1* | 4/2013 | Umezawa | G08G 1/166 348/47 |
| 2014/0092236 | A1* | 4/2014 | Findeisen | G06K 9/00791 348/118 |
| 2014/0313339 | A1 | 10/2014 | Diessner | |
| 2016/0312517 | A1* | 10/2016 | Elie | E05F 15/73 |
| 2016/0371845 | A1* | 12/2016 | Yasovsky | G02B 27/4205 |
| 2017/0185763 | A1* | 6/2017 | Jeromin | G06F 21/32 |
| 2017/0185851 | A1* | 6/2017 | Jeromin | G06K 9/00208 |
| 2017/0220875 | A1* | 8/2017 | Jeromin | G06K 9/00791 |

OTHER PUBLICATIONS

International Search Report dated May 26, 2017, for PCT Application No. PCT/US2017/014738, filed Jan. 24, 2017, three pages.

* cited by examiner

STEREO CAMERA-BASED DETECTION OF OBJECTS PROXIMATE TO A VEHICLE

CROSS REFERENCE TO RELATED APPLICATION

This application claims the benefit of U.S. Provisional Patent Application No. 62/272,556, filed on Dec. 29, 2015, the entire disclosure of which is incorporated herein by reference in its entirety for all intended purposes.

FIELD OF THE DISCLOSURE

This relates generally to camera-based object detection, and more particularly, to detecting objects using one or more cameras on a vehicle to prevent the opening of a door into the objects.

BACKGROUND OF THE DISCLOSURE

Modern vehicles, especially automobiles, increasingly include various sensors for detecting and gathering information about the vehicles' surroundings. These sensors may include ultrasonic sensors for detecting the proximity of a vehicle to objects in the vehicle's surroundings. However, ultrasonic sensors may have limited accuracy in certain situations, such as when the objects are relatively close to the sensors. Therefore, an alternative solution to object detection can be desirable.

SUMMARY OF THE DISCLOSURE

Examples of the disclosure are directed to using a stereo camera to detect objects in proximity to a vehicle. In some examples, the vehicle determines whether those objects will interfere with the opening of one or more doors on the vehicle, and if they will, prevents the opening of the doors into those objects.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some vehicles, such as automobiles, may include ultrasonic sensors for detecting the proximity of the vehicles to objects in the vehicles' surroundings. However, ultrasonic sensors may have limited accuracy in certain situations, such as when the objects are relatively close to the sensors.

Examples of the disclosure are directed to using one or more cameras to detect objects in proximity to a vehicle. In some examples, the vehicle determines whether those objects will interfere with the opening of one or more doors on the vehicle, and if they will, prevents the opening of the doors into those objects.

Figure 1:
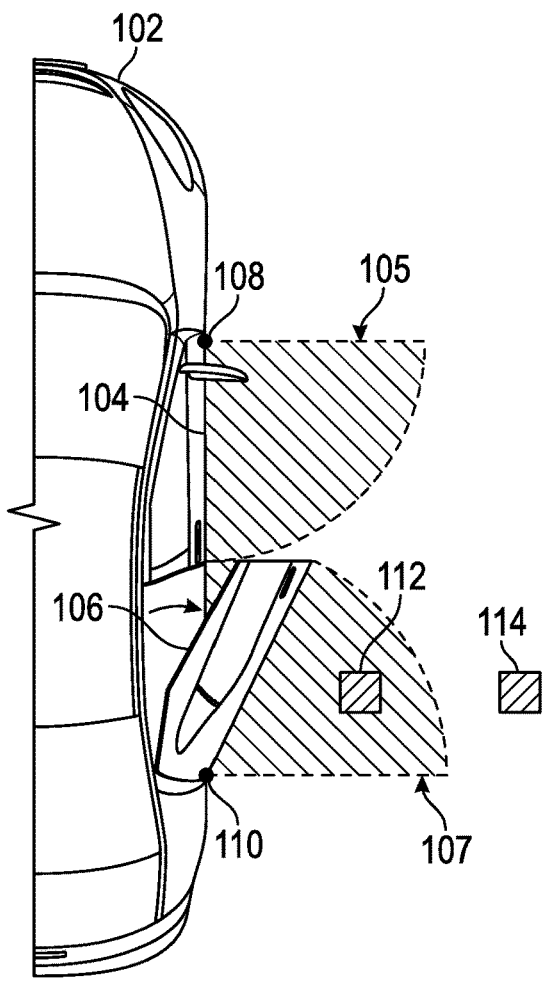
FIG. 1 illustrates an exemplary vehicle having two doors according to examples of the disclosure.

FIG. 1 illustrates exemplary vehicle 102 having doors 104 and 106 according to examples of the disclosure. Vehicle 102 can be any vehicle, such as an automobile, bus, truck, van, airplane, boat, and so on. A right-half of vehicle 102 is illustrated in FIG. 1, though it is understood that the vehicle can include a left-half as well. Vehicle 102 can include one or more elements that can open into a space external to the vehicle. For example, vehicle 102 can include doors 104 and 106 that can be coupled to the vehicle via hinges 108 and 110, respectively. Interaction spaces 105 and 107 can be spaces, external to vehicle 102, into which doors 104 and 106, respectively, can open. Although FIG. 1 illustrates a vehicle having two doors on each side, it should be understood that the disclosed systems and methods can also be adopted on vehicles with a different number of doors (e.g., 1 door on each side). The examples of the disclosure will be described in the context of doors, though it is understood that the examples of the disclosure can be implemented in the context of any element on vehicle 102 that can open into a space external to the vehicle, such as hoods, trunk lids, windows, gas cap access covers, side view mirrors, etc.

It can be beneficial for one or more systems on vehicle 102 to determine whether an object will interfere with the opening of doors 104 and/or 106 (e.g., a full opening of doors 104 and/or 106). For example, if doors 104 and/or 106 are automatic doors (e.g., if the doors open, using motors, in response to a user command (e.g., pressing of a button or being within a certain proximity of the door or door handle) to open the doors), and if an object will interfere with the opening of doors 104 and/or 106, vehicle 102 can determine to provide a warning to an operator of the vehicle about the interfering object, prevent the opening of doors 104 and/or 106, and/or only open doors 104 and/or 106 to the extent permitted by the interfering object (e.g., only open door 106 halfway). If doors 104 and/or 106 are manual doors (e.g., if the doors are opened by hand), vehicle 102 can similarly determine to provide a warning to an operator of the vehicle about the interfering object, prevent the opening of doors 104 and/or 106 (e.g., by locking the doors or the door opening mechanism), and/or only allow doors 104 and/or 106 to open to the extent permitted by the interfering object.

In some examples, vehicle 102 can determine whether an object will interfere with the opening of one or more of doors 104 and 106 by determining whether the object is within interaction spaces 105 and 107, respectively. For example, referring to FIG. 1, vehicle 102 can determine that object 112 (e.g., a wall, a pillar, a tree, a parking meter, etc.) is within interaction space 107 of door 106. Thus, vehicle 102 can determine that object 112 will interfere with the opening of door 106, and the vehicle can determine an appropriate response, as detailed above. In contrast, vehicle 102 can determine that object 114 is not within interaction space 107 (nor any other interaction spaces), and thus will not interfere with the opening of door 106 (or any other door). Similarly, vehicle 102 can determine that no object is within interaction space 105 of door 104, and thus can allow door 104 to open freely.

The vehicle of the disclosure can determine whether one or more objects will interfere with the opening of one or more doors by using one or more stereo cameras, as will be discussed below. In particular, the examples of the disclosure can use image data from two or more image sensors to create a depth map in the interaction space of a door and then determine whether an object in the depth map intersects with the interaction space of the door.

Figure 2A:
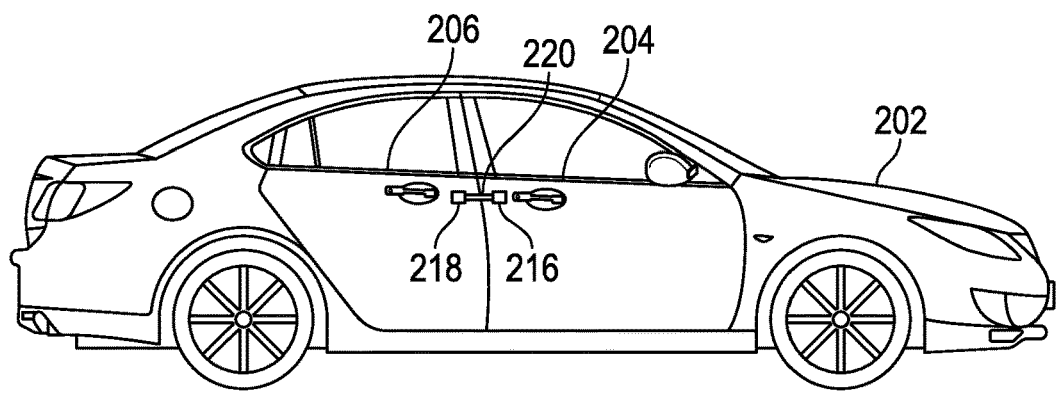
FIGS. 2A-2C illustrate an exemplary vehicle having a side-facing stereo camera according to examples of the disclosure.
Figure 2C:
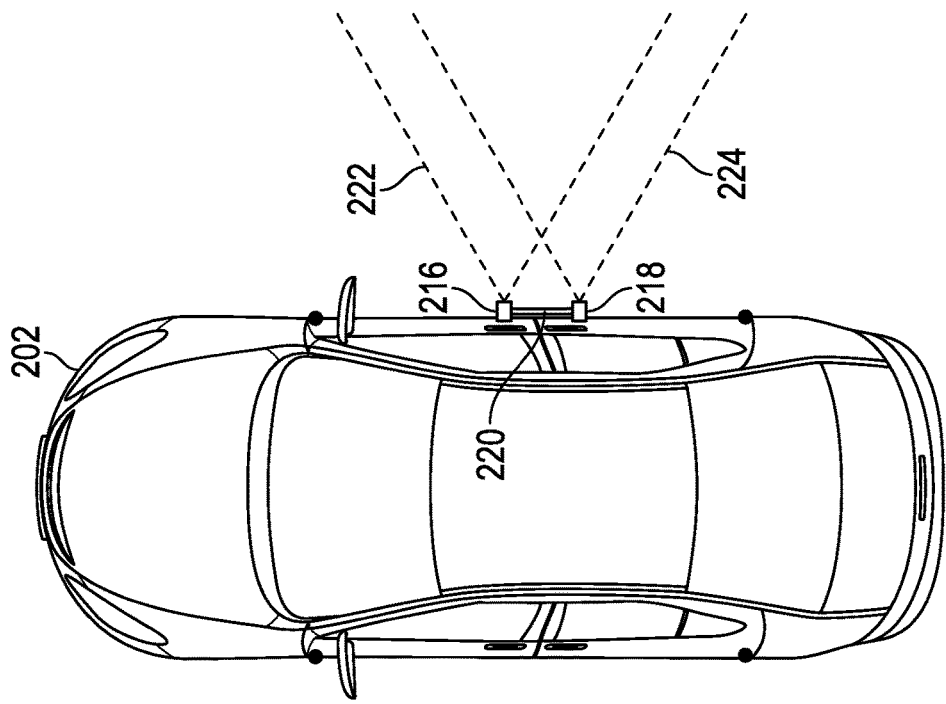
Figure 2B:
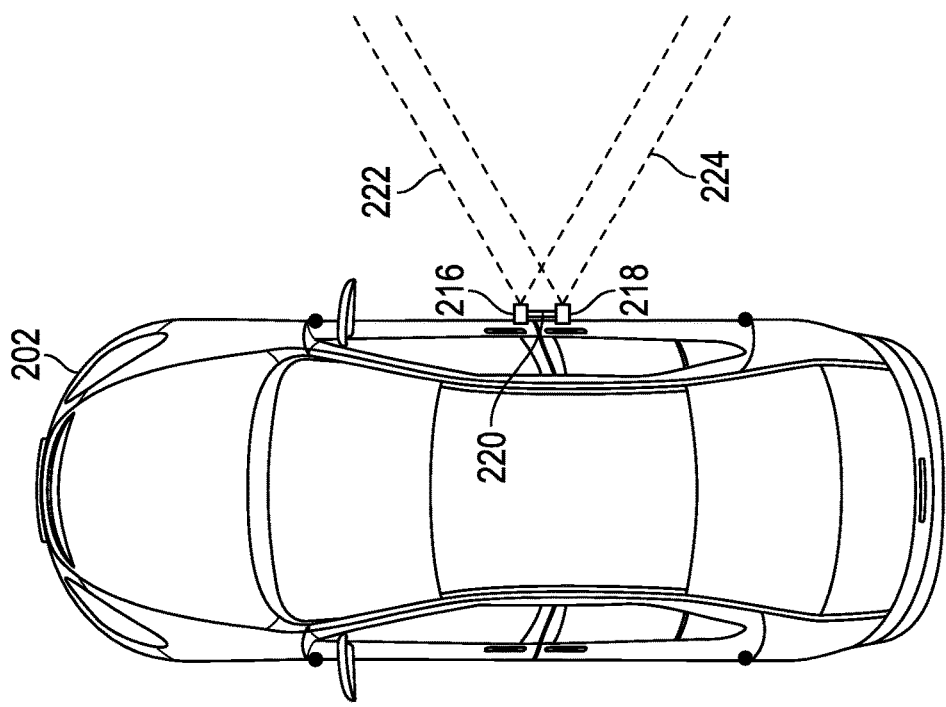

FIGS. 2A-2C illustrate a side view of exemplary vehicle 202 having a stereo camera including a first image sensor 216 and a second image sensor 218 according to examples of the disclosure. Similar to vehicle 102 in FIG. 1, vehicle 202 in FIG. 2 can have right-hand doors 204 and 206. Image sensors 216 and 218 can be any type of camera, such as visible light cameras, infrared cameras, ultraviolet cameras, etc. The image sensors 216 and 218 may be separated by a baseline distance 220 (e.g., the distance between the center of each image sensor).

In some examples, each image sensor may be mounted on a corresponding door. For example, FIG. 2A illustrates image sensor 216 mounted on door 204 and image sensor 218 mounted on door 206. In some examples, each door may have its own corresponding stereo camera (e.g., two image sensors per door). Each image sensor can have a corresponding field of view that is substantially side-facing. For example, image sensor 216 mounted on door 204 can have the field of view 222, and image sensor 218 mounted on door 206 can have the field of view 224. As illustrated in FIGS. 2B-2C, an overlap between the field of view of each image sensor can comprise the stereo field of view of the stereo camera, as described in further detail below.

The image sensors 216 and 218 can be utilized to determine whether an object (e.g., object 112) will interfere with the opening of one or more of doors 204 and 206 (e.g., by determining whether the object is within the interaction spaces of doors 204 and/or 206, as previously described). In particular, vehicle 202 can, based on the different perspectives of the image sensors 216 and 218 with respect to an object, determine a relative location of the object with respect to the vehicle, as will be described in more detail below. Because vehicle 202 can know the interaction spaces of doors 204 and 206 before the above determination is made, the vehicle can compare the determined relative location of an object to the interaction spaces of doors 204 and 206 to determine whether the object is within one or more of those interaction spaces. In some examples, the interaction spaces of doors 204 and 206 can be stored in a memory in vehicle 202 prior to the above-described determinations being made (e.g., when vehicle 202 is manufactured, or during a calibration procedure performed after manufacture of the vehicle).

Vehicle 202 can use any suitable method(s) for determining the relative location of an object using image sensors 216 and 218 that make up the stereo camera, such as any algorithm that generates a depth map from stereo images. In such algorithms, the relative locations of one or more objects in the stereo field of view can be determined by co-locating pixels in the image data from each sensor that belong to the same object. Co-locating pixels in images from different views can take into account color, shape, edges, etc. For example, in a simple example, a dark red object that is the size of a single pixel in an image can be simply located in image data from each sensor, especially if the red object is against a white background. If the pixel corresponding to the red object is in a different position in the image from each sensor, a disparity can be determined for the red object between the two sets of image data. This disparity is inversely proportional to the distance of the red object from the vehicle (i.e., a smaller disparity indicates the object is farther from the vehicle, and a larger disparity indicates the object is closer to the vehicle). The disparity value can be used to triangulate the object. A distance estimate for each pixel that is co-located between the two sets of image data can be calculated based on the disparity value for that pixel and the baseline distance between the two image sensors. In some examples, other information, such as the focal length of each image sensor, can also be used in determining distance estimates for each pixel. In this way, a depth map can be generated including a set of distance estimates for each pixel that can be co-located between the sets of image data from each image sensor.

Because the image sensors 216 and 218 can be mounted to vehicle 202, as previously described, a depth map of the vehicle's surroundings visible to the image sensors can be determined. For example, if an object is within the field of view of both image sensors 216 and 218, a depth map can be generated that indicates the position of the object, from which the vehicle can determine whether an object will interfere with the opening of one or both of doors 204 and 206.

In some examples, image sensors 216 and 218 can be mounted on vehicle 202 at known locations on the vehicle (e.g., known positions, heights, orientations, etc.). Thus, when making the determinations about the location(s) of object(s) in vehicle's 202 surroundings, one or more of these known quantities can be used by the vehicle to increase the accuracy of the depth maps as compared with situations where image sensor location may not be known. In other words, one or more of the known locations of the image sensors, for example, can be used to determine the location of objects relative to vehicle 202.

In some examples, the baseline distance between the image sensors 216 and 218 can be selected based on the interaction spaces of the doors 204 and 206. For example, as illustrated in FIGS. 2B-2C, the usable stereo field of view is larger when the baseline distance between the sensors is smaller, as in FIG. 2B, as compared to FIG. 2C, which illustrates a larger baseline distance corresponding to a smaller stereo field of view. A larger stereo field of view may be desirable to capture more of the interaction spaces of the doors 204 and 206 in the stereo field of view. However, the depth map generation process becomes more accurate as the baseline distance increases. Accordingly, the baseline distance between the image sensors can be chosen to balance the accuracy of the depth map versus coverage of the stereo field of view. In one example, the longest baseline distance may be selected that still covers a threshold proportion (e.g., 90%) of the interaction spaces of the doors.

In some examples, the depth maps discussed above can be generated when an input for opening a door is received (e.g., after the vehicle comes to a stop), and the depth maps can be utilized to determine whether an object will prevent opening of any of the doors of the vehicle. In other examples, the depth maps can be determined only after vehicle 202 determines that it will likely come to a stop within a threshold amount of time (e.g., 1 second, 5 seconds, 10 seconds, etc.), which can be based on an assumption that the doors of the vehicle are unlikely to be opened while the vehicle is in motion. In this way, vehicle 202 may avoid generating depth maps when traveling at relatively constant speeds on a freeway or a road, for example. In such examples, once vehicle 202 determines that it will likely come to a stop, generation of the depth maps can be triggered such that the maps can be ready when the vehicle is stopped and a door is being—or, is requested to be—opened. In some examples, vehicle 202 can determine that it will likely come to a stop within a threshold amount of time if the vehicle slows down below a threshold speed (e.g., 5 mph, 10 mph, etc.) or is decelerating above a threshold rate from a detected speed of travel. In some examples, the depth maps may be generated only after vehicle 202 actually does stop, at which time the vehicle can process image data from image sensors 216 and 218 to determine the depth maps. In some examples, the depth maps may be generated when the vehicle is placed in park, or when an approaching user is detected (e.g., by detecting the user's key fob or by recognizing the user using a camera).

In some examples, a vehicle can use the stereo camera in conjunction with other methods of detecting a possible object that would interfere with opening a door. For example, another detection method (e.g., ultrasonic detection, radar, etc.) may be used as a fallback when conditions are not conducive to relying on the stereo camera. For example, when there is low ambient light, or when the environment has low contrast (e.g., a white wall), the stereo camera may fail to properly detect an object that would interfere with an opening door. Accordingly, in some examples, the vehicle may use both the stereo camera and ultrasonic detection to determine whether the door should be opened. In other examples, the stereo camera may be used and a confidence value may be generated based on, for example, ambient light or the proportion of pixels that were successfully co-located between the two images. If the confidence value falls below a predetermined threshold (e.g., 90%), then ultrasonic detection may be used instead of the stereo camera. In some examples, when the confidence value falls below a predetermined threshold, a user may be notified of a warning (e.g., via an audio notification, such as a beep, or a graphical notification on a display) that the vehicle cannot determine whether an object would interfere with the door opening.

Figure 3:
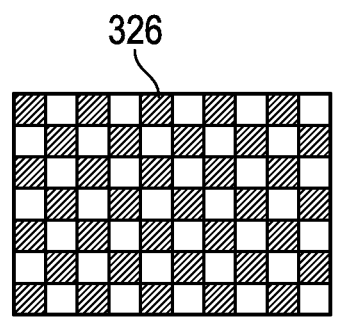
FIG. 3 illustrates an exemplary stereo camera calibration pattern according to examples of the disclosure.

FIG. 3 illustrates an exemplary stereo camera calibration pattern 326 according to examples of the disclosure. The calibration pattern can be used to calibrate the depth mapping algorithm to account for physical positioning and characteristics of each image sensor on a vehicle. For example, the same pattern 326 can be captured by each image sensor using the same relative positioning of the pattern with respect to the image sensor. Based on differences between the two sets of image data, the translation and rotation of the second image sensor relative to the first image sensor can be computed. These translation and rotation parameters can then be used as calibration parameters to rectify images from the second image sensor during use of the stereo camera to make images from the first and second image sensors appear as if the two image planes are parallel, even if there are idiosyncrasies in the orientations of the two image sensors. For example, the squares of the checkerboard pattern should appear collinear between the two images, and if they are not collinear, parameters may be calculated for a mapping equation to make the squares of the checkerboard pattern collinear in the two images.

Figure 4:
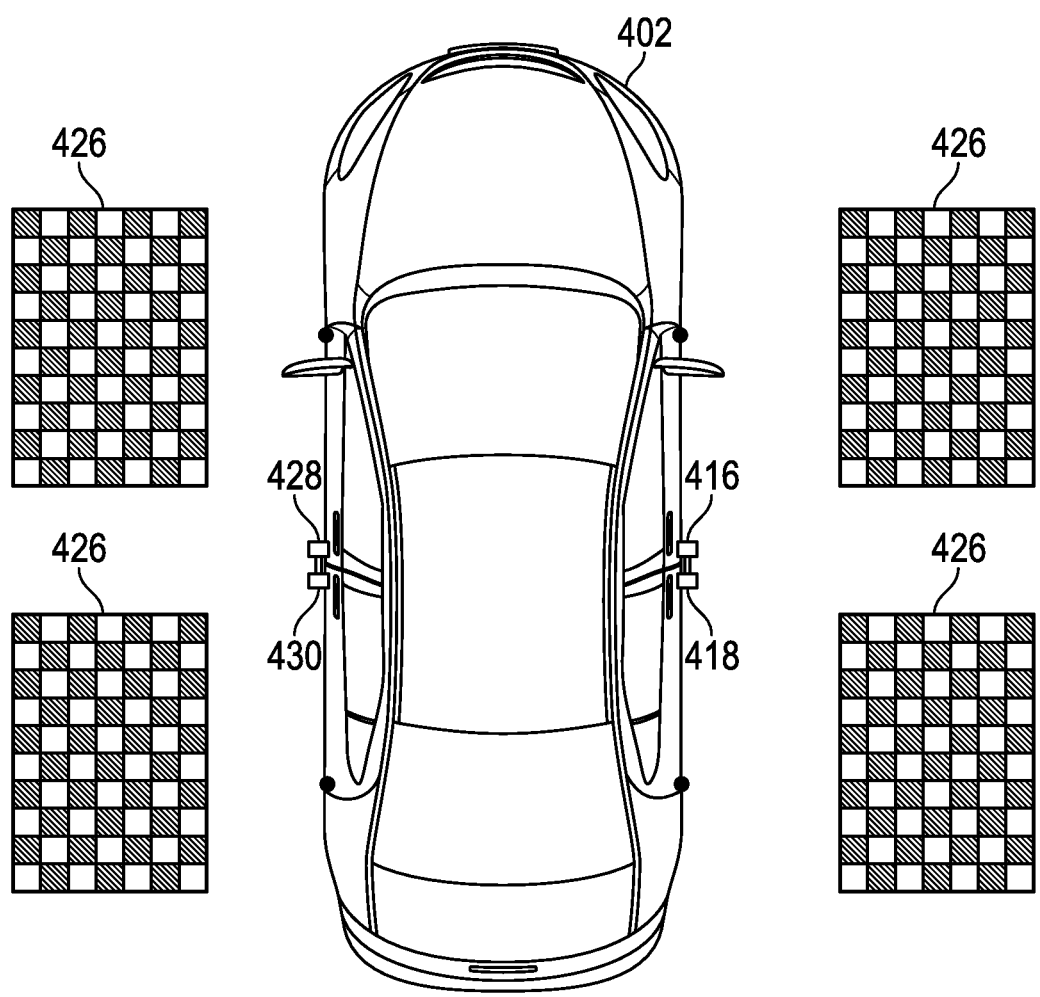
FIG. 4 illustrates an exemplary calibration of side-facing stereo cameras according to examples of the disclosure.

FIG. 4 illustrates an exemplary calibration of side-facing stereo cameras according to examples of the disclosure. Multiple calibration patterns 426 may be situated on a vehicle assembly line such that, when a vehicle 402 stops at a calibration station of the assembly line, the calibration patterns are aligned with each of the side-facing image sensors 416, 418, 428, and 430 (e.g., each corresponding calibration pattern may be positioned to be parallel to an assumed ideal focal plane of each image sensor). For example, the calibration station of the assembly line may follow the portion of the assembly line that installs the doors onto the chassis of the vehicle. After being automatically moved into position on the assembly line at the calibration station, each of the image sensors may automatically capture an image of its corresponding calibration pattern, and calibration parameters may be computed for each image sensor pair. For example, the vehicle may compute a rotation and translation of image sensor 418 with respect to image sensor 416 for later use in rectifying images from image sensor 418. Similarly, the vehicle may compute a rotation and translation of image sensor 430 with respect to image sensor 428 for later user in rectifying images from image sensor 430. In some examples, the vehicle 402 may not stop at a calibration station, and the calibration patterns 426 may instead move along the assembly line at the same velocity as the vehicle 402, ensuring proper alignment for calibration. Although FIG. 4 illustrates a calibration pattern for each images sensor, in some examples, a single calibration pattern may be used for each pair of image sensors, and the vehicle may be moved from a first position where the calibration pattern is aligned with a first image sensor of the pair or a second position where the calibration pattern is aligned with a second image sensor of the pair, and a calibration image may be captured at each of the first and second positions.

Figure 5:
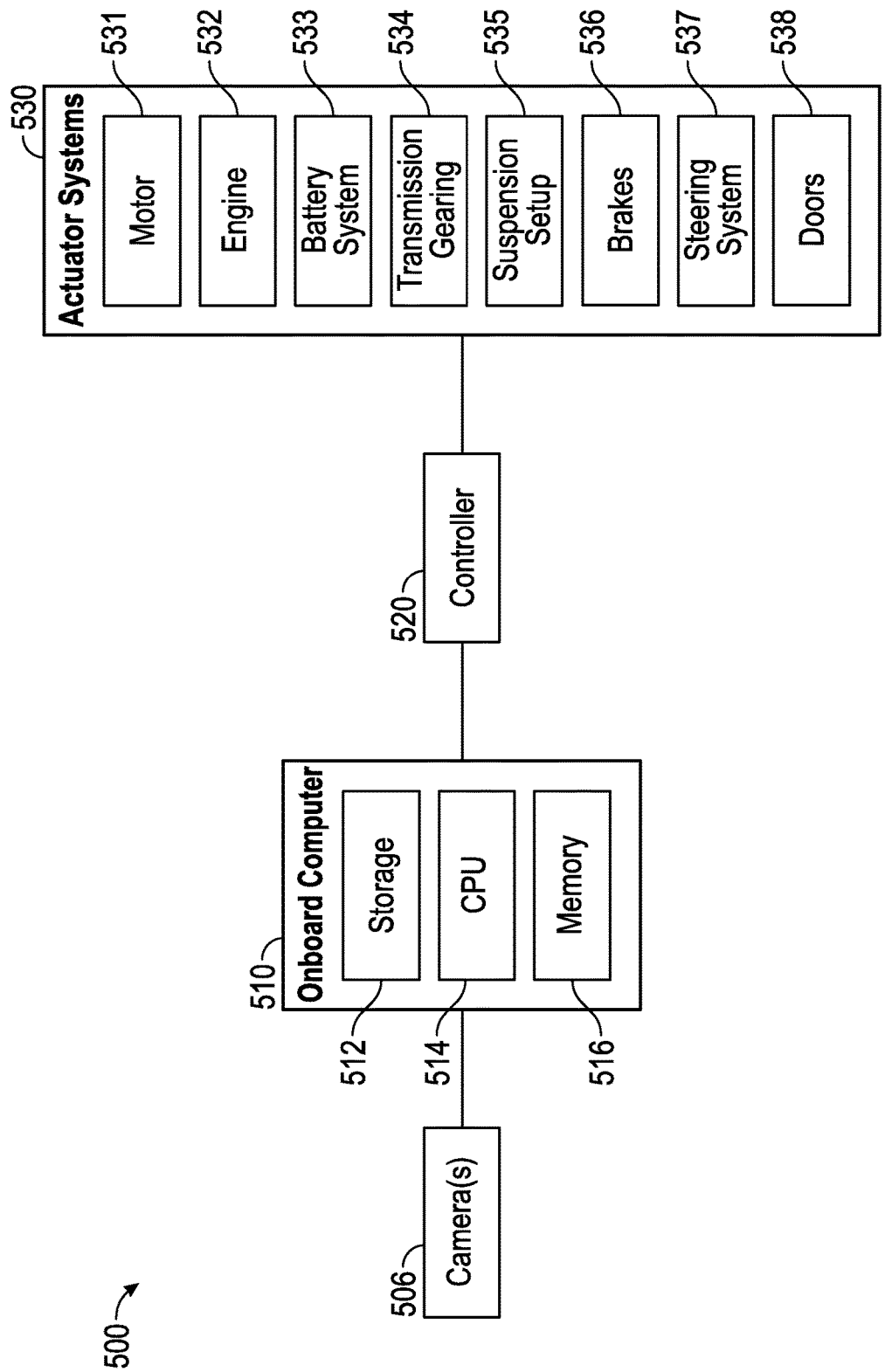
FIG. 5 illustrates a system block diagram according to examples of the disclosure.

FIG. 5 illustrates a system block diagram according to examples of the disclosure. Vehicle control system 500 can perform any of the methods described with reference to FIGS. 1-4. System 500 can be incorporated into a vehicle, such as a consumer automobile. Other example vehicles that may incorporate the system 500 include, without limitation, airplanes, boats, or industrial automobiles. Vehicle control system 500 can include one or more cameras 506 capable of capturing image data (e.g., video data), as previously described. Vehicle control system 500 can include an on-board computer 510 coupled to the cameras 506, and capable of receiving the image data from the camera and determining whether one or more objects in the image data will interfere with the opening of one or more doors of the vehicle, and with which doors the objects will interfere, as described in this disclosure. On-board computer 510 can include storage 512, memory 516, and a processor 514. Processor 514 can perform any of the methods described with reference to FIGS. 1-4. Additionally, storage 512 and/or memory 516 can store data and instructions for performing any of the methods described with reference to FIGS. 1-4. Storage 512 and/or memory 516 can be any non-transitory computer readable storage medium, such as a solid-state drive or a hard disk drive, among other possibilities. The vehicle control system 500 can also include a controller 520 capable of controlling one or more aspects of vehicle operation, such as moving the vehicle or controlling door operation based on the determinations of the on-board computer 510.

In some examples, the vehicle control system 500 can be connected to (e.g., via controller 520) one or more actuator systems 530 in the vehicle. The one or more actuator systems 530 can include, but are not limited to, a motor 531 or engine 532, battery system 533, transmission gearing 534, suspension setup 535, brakes 536, steering system 537 and door system 538. Based on the determined locations of one or more objects relative to the interaction spaces of doors 538, the vehicle control system 500 can control one or more of these actuator systems 530 to prevent the opening of a door into one of the objects. This can be done by, for example, controlling operation of doors 538 as discussed in this disclosure. As another example, the vehicle control system 500 can move the vehicle, such that the door to be opened will be free to open, by adjusting the steering angle and engaging the drivetrain (e.g., motor) to move the vehicle at a controlled speed. The camera system 506 can continue to capture images and send them to the vehicle control system 500 for analysis, as detailed in the examples above. The vehicle control system 500 can, in turn, continuously or periodically send commands to the one or more actuator systems 530 to prevent the opening of a door into one of the objects.

Thus, the examples of the disclosure provide various ways to prevent the opening of a vehicle door into an object using one or more cameras.

In some embodiments, a system is disclosed. The system may comprise one or more processors; and a memory including instructions, which when executed by the one or more processors, cause the one or more processors to perform a method. The method may include: receiving first image data from a first image sensor mounted on a vehicle and second image data from a second image sensor mounted on the vehicle, the vehicle including an element configured to open into a space external to the vehicle; generating a depth map from a comparison of the first image data and the second image data, the depth map including an object; in accordance with a determination that the object, in the depth map, is within the space into which the element is configured to open, determining that the object will interfere with opening of the element into the space; and in accordance with a determination that the object, in the depth map, is not within the space into which the element is configured to open, determining that the object will not interfere with opening of the element into the space. Additionally or alternatively, the element comprises a door configured to open into an interaction space external to the vehicle. Additionally or alternatively, the first image sensor is mounted on the door, and the second image sensor is mounted on an additional door of the vehicle. Additionally or alternatively, generating the depth map comprises: in accordance with a determination that the vehicle will likely stop within a time threshold, generating the depth map; and in accordance with a determination that the vehicle will not likely stop within the time threshold, forgoing generating the depth map. Additionally or alternatively, generating the depth map comprises: in accordance with a determination that the vehicle is stopped, generating the depth map; and in accordance with a determination that the vehicle is not stopped, forgoing generating the depth map. Additionally or alternatively, the first image sensor is mounted a first distance from the second image sensor, and the depth map is generated based on the first distance. Additionally or alternatively, the first and second image sensors comprise a stereo camera. Additionally or alternatively, the method may further include: generating a confidence value associated with the depth map; and comparing the confidence value to a predetermined threshold. Additionally or alternatively, the method may further include: in accordance with the confidence value being below the predetermined threshold, locating the object using ultrasonic detection before opening the element into the space. Additionally or alternatively, the method may further include: in accordance with the confidence value being below the predetermined threshold, generating a warning notification before opening the element into the space. Additionally or alternatively, the method may further include: in accordance with a determination that the object will interfere with the opening of the element into the space, preventing the opening of the element; and in accordance with a determination that the object will not interfere with the opening of the element into the space, allowing the opening of the element. Additionally or alternatively, the method may further include: detecting user input for opening the element; in response to detecting the user input: in accordance with a determination that the object will interfere with the opening of the element into the space, partially opening the element into the space to the extent allowed by the object; and in accordance with a determination that the object will not interfere with the opening of the element into the space, fully opening the element into the space. Additionally or alternatively, the method may further include: detecting a user approaching the vehicle; in response to detecting the user approaching the vehicle: in accordance with a determination that the object will interfere with the opening of the element into the space, partially opening the element into the space to the extent allowed by the object; and in accordance with a determination that the object will not interfere with the opening of the element into the space, fully opening the element into the space.

In some embodiments, a system is disclosed. The system may include: one or more processors; and a memory including instructions, which when executed by the one or more processors, cause the one or more processors to perform a method of calibrating a vehicle including substantially side-facing first and second image sensors. The method may include causing the vehicle to move along an assembly line such that the first image sensor is aligned with a first calibration target situated alongside the vehicle; causing the first image sensor to capture first image data of the first calibration target; and computing calibration parameters based on the first image data. Additionally or alternatively, the method may further include: causing the vehicle to move further along the assembly line such that the second image sensor is aligned with the first calibration target; and causing the second image sensor to capture second image data of the first calibration target, wherein the calibration parameters are further computed based on the second image data. Additionally or alternatively, the second image sensor is aligned with a second calibration target alongside the vehicle when the first image sensor is aligned with the first calibration target, the method may further include: causing the second image sensor to capture second image data of the second calibration target, wherein the calibration parameters are further computed based on the second image data.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
   one or more processors; and
   a memory including instructions, which when executed by the one or more processors, cause the one or more processors to perform a method comprising:
      receiving first image data from a first image sensor mounted on a vehicle and second image data from a second image sensor mounted on the vehicle, the vehicle including an element configured to open into a space external to the vehicle;
      generating a depth map from a comparison of the first image data and the second image data, the depth map including an object;
      generating a confidence value associated with the depth map; and comparing the confidence value to a predetermined threshold;
      in accordance with the confidence value being above the predetermined threshold and a determination that the object, in the depth map, is within the space into which the element is configured to open, determining that the object will interfere with opening of the element into the space; and in accordance with the confidence value being above the predetermined threshold and a determination that the object, in the depth map, is not within the space into which the element is configured to open, determining that the object will not interfere with opening of the element into the space;

in accordance with the confidence value being below the predetermined threshold, locating the object using ultrasonic detection;

in accordance with a determination that the object, as located using ultrasonic detection, is within the space into which the element is configured to open, determining that the object will interfere with opening of the element into the space; and in accordance with a determination that the object, as located using ultrasonic detection, is not within the space into which the element is configured to open, generating a warning notification and determining that the object will not interfere with opening of the element into the space.

2. The system of claim 1, wherein the element comprises a door configured to open into an interaction space external to the vehicle.

3. The system of claim 2, wherein the first image sensor is mounted on the door, and the second image sensor is mounted on an additional door of the vehicle.

4. The system of claim 1, wherein generating the depth map comprises:
in accordance with a determination that the vehicle will likely stop within a time threshold, generating the depth map; and
in accordance with a determination that the vehicle will not likely stop within the time threshold, forgoing generating the depth map.

5. The system of claim 1, wherein generating the depth map comprises:
in accordance with a determination that the vehicle is stopped, generating the depth map; and
in accordance with a determination that the vehicle is not stopped, forgoing generating the depth map.

6. The system of claim 1, wherein the first image sensor is mounted a first distance from the second image sensor, and the depth map is generated based on the first distance.

7. The system of claim 1, wherein the first and second image sensors comprise a stereo camera.

8. The system of claim 1, wherein the method further comprises:
in accordance with a determination that the object will interfere with the opening of the element into the space, preventing the opening of the element; and
in accordance with a determination that the object will not interfere with the opening of the element into the space, allowing the opening of the element.

9. The system of claim 1, wherein the method further comprises:
detecting user input for opening the element;
in response to detecting the user input:
in accordance with a determination that the object will interfere with the opening of the element into the space, partially opening the element into the space to the extent allowed by the object; and
in accordance with a determination that the object will not interfere with the opening of the element into the space, fully opening the element into the space.

10. The system of claim 1, wherein the method further comprises:
detecting a user approaching the vehicle;
in response to detecting the user approaching the vehicle:
in accordance with a determination that the object will interfere with the opening of the element into the space, partially opening the element into the space to the extent allowed by the object; and
in accordance with a determination that the object will not interfere with the opening of the element into the space, fully opening the element into the space.

11. A non-transitory computer-readable medium including instructions, which when executed by one or more processors, cause the one or more processors to perform a method comprising:
receiving first image data from a first image sensor mounted on a vehicle and second image data from a second image sensor mounted on the vehicle, the vehicle including an element configured to open into a space external to the vehicle;
generating a depth map from a comparison of the first image data and the second image data, the depth map including an object;
generating a confidence value associated with the depth map; and comparing the confidence value to a predetermined threshold;
in accordance with the confidence value being above the predetermined threshold and a determination that the object, in the depth map, is within the space into which the element is configured to open, determining that the object will interfere with opening of the element into the space; and
in accordance with the confidence value being above the predetermined threshold and a determination that the object, in the depth map, is not within the space into which the element is configured to open, determining that the object will not interfere with opening of the element into the space;
in accordance with the confidence value being below the predetermined threshold,
locating the object using ultrasonic detection;
in accordance with a determination that the object, as located using ultrasonic detection, is within the space into which the element is configured to open, determining that the object will interfere with opening of the element into the space; and
in accordance with a determination that the object, as located using ultrasonic detection, is not within the space into which the element is configured to open, generating a warning notification and determining that the object will not interfere with opening of the element into the space.

12. A method comprising:
receiving first image data from a first image sensor mounted on a vehicle and second image data from a second image sensor mounted on the vehicle, the vehicle including an element configured to open into a space external to the vehicle;
generating a depth map from a comparison of the first image data and the second image data, the depth map including an object;
generating a confidence value associated with the depth map; and comparing the confidence value to a predetermined threshold;
in accordance with the confidence value being above the predetermined threshold and a determination that the object, in the depth map, is within the space into which the element is configured to open, determining that the object will interfere with opening of the element into the space; and in accordance with the confidence value being above the predetermined threshold and a determination that the object, in the depth map, is not within the space into which the element is configured to open, determining that the object will not interfere with opening of the element into the space;

in accordance with the confidence value being below the predetermined threshold, locating the object using ultrasonic detection;

in accordance with a determination that the object, as located using ultrasonic detection, is within the space into which the element is configured to open, determining that the object will interfere with opening of the element into the space; and in accordance with a determination that the object, as located using ultrasonic detection, is not within the space into which the element is configured to open, generating a warning notification and determining that the object will not interfere with opening of the element into the space.

13. A vehicle comprising:

a first image sensor;

a second image sensor;

an element configured to open into a space external to the vehicle; and a memory including instructions, which when executed by one or more processors, cause the one or more processors to perform a method comprising:

receiving first image data from the first image sensor mounted on the vehicle and second image data from the second image sensor mounted on the vehicle;

generating a depth map from a comparison of the first image data and the second image data, the depth map including an object;

generating a confidence value associated with the depth map; and comparing the confidence value to a predetermined threshold;

in accordance with the confidence value being above the predetermined threshold and a determination that the object, in the depth map, is within the space into which the element is configured to open, determining that the object will interfere with opening of the element into the space; and in accordance with the confidence value being above the predetermined threshold and a determination that the object, in the depth map, is not within the space into which the element is configured to open, determining that the object will not interfere with opening of the element into the space;

in accordance with the confidence value being below the predetermined threshold, locating the object using ultrasonic detection;

in accordance with a determination that the object, as located using ultrasonic detection, is within the space into which the element is configured to open, determining that the object will interfere with opening of the element into the space; and in accordance with a determination that the object, as located using ultrasonic detection, is not within the space into which the element is configured to open, generating a warning notification and determining that the object will not interfere with opening of the element into the space.

\* \* \* \* \*